(12) United States Patent  (10) Patent No.: US 7,706,569 B2
Iwamura  (45) Date of Patent: Apr. 27, 2010

(54) IMAGE PROCESSING DEVICE, IMAGE PROCESSING METHOD THEREOF, COMPUTER PROGRAM, AND COMPUTER-READABLE STORAGE MEDIUM

(75) Inventor: Keiichi Iwamura, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 806 days.

(21) Appl. No.: 11/570,095

(22) PCT Filed: Jun. 9, 2005

(86) PCT No.: PCT/JP2005/010994
§ 371 (c)(1), (2), (4) Date: Dec. 6, 2006

(87) PCT Pub. No.: WO2005/122548
PCT Pub. Date: Dec. 22, 2005

(65) Prior Publication Data
US 2007/0258619 A1   Nov. 8, 2007

(30) Foreign Application Priority Data
Jun. 11, 2004 (JP) .............................. 2004-174519
Jun. 7, 2005 (JP) .............................. 2005-167416

(51) Int. Cl.
*G06K 9/00* (2006.01)
*H03M 13/00* (2006.01)
(52) U.S. Cl. ........................ 382/100; 382/233; 714/755
(58) Field of Classification Search ................ 382/100, 382/112, 168, 181, 182, 190, 197, 232, 233, 382/234, 235, 236, 237, 238, 239, 243, 248, 382/274, 275, 276, 305, 312; 713/176; 714/775, 714/784, 755
See application file for complete search history.

(56) References Cited

U.S. PATENT DOCUMENTS

| | | | | |
|---|---|---|---|---|
| 5,535,140 | A | 7/1996 | Iwamura | 364/550 |
| 5,604,752 | A | 2/1997 | Iwamura | 371/37.1 |
| 5,742,620 | A * | 4/1998 | Iwamura | 714/784 |
| 6,434,253 | B1 * | 8/2002 | Hayashi et al. | 382/100 |
| 6,807,285 | B1 * | 10/2004 | Iwamura | 382/100 |
| 7,076,720 | B1 * | 7/2006 | Yoshida et al. | 714/755 |
| 7,103,827 | B2 * | 9/2006 | Iwamura | 714/775 |
| 7,639,835 | B2 * | 12/2009 | Hayashi | 382/100 |
| 7,646,881 | B2 * | 1/2010 | Zarrabizadeh | 382/100 |
| 2003/0012406 | A1 | 1/2003 | Iwamura | 382/100 |
| 2003/0190042 | A1 | 10/2003 | Tagashira et al. | 380/45 |
| 2004/0015698 | A1 * | 1/2004 | Okada et al. | 713/176 |

FOREIGN PATENT DOCUMENTS

| | | |
|---|---|---|
| EP | 0933919 A2 | 8/1999 |
| GB | 2392337 A | 2/2004 |
| JP | 11-289255 | 10/1999 |
| JP | 2003-092676 | 3/2003 |
| JP | 2004-007226 | 1/2004 |
| JP | 2004-111018 | 4/2004 |
| JP | 2004-163855 | 6/2004 |

* cited by examiner

*Primary Examiner*—Seyed Azarian
(74) *Attorney, Agent, or Firm*—Fitzpatrick, Cella, Harper & Scinto

(57) ABSTRACT

The present invention aims to be able to provide an efficient public key digital watermark method which is specialized to information common to contents. In the method, arrangement order of digital data in input digital contents is set to become predetermined arrangement order so that the input digital contents constitute an error correction code.

17 Claims, 10 Drawing Sheets

IMAGE PROCESSING DEVICE, IMAGE PROCESSING METHOD THEREOF, COMPUTER PROGRAM, AND COMPUTER-READABLE STORAGE MEDIUM

TECHNICAL FIELD

The present invention relates to an image processing device and an image processing method. In particular, the present invention relates to a technique which is suitable to protect copyright in digital information.

BACKGROUND ART

In recent years, development of computers and development of networks are remarkable, whereby various kinds of information data such as character data, image data, voice data and the like are handled in the computers and the networks. Therefore, contents business for dealing in so-called digital contents such as digital still images, digital moving images, digital music and the like on the network becomes remarkably active.

Incidentally, since the target of the contents business is the digital data, such a fact brings about an environment that a duplicate of homogeneous data can be easily generated. For this reason, in order to protect the copyright of the data which can be easily duplicated in the above environment, a process for embedding copyright information and/or user information in the image data and/or the voice data as a digital watermark is often executed.

Here, it should be noted that a digital watermark technique is the technique for executing a predetermined process to the image data and/or the voice data so as to concealedly or secretly embed another information in the image data and/or the voice data. In this connection, if the digital watermark is extracted from the digital data, then the copyright information, the user information, discrimination information and the like can be acquired from the extracted digital watermark, whereby it is possible to follow up illegal copy and illegal use.

By the way, in the commercially available digital watermark technique, any algorithm thereof is not published ordinarily. This is because security in the digital watermark technique is based on the premise that the algorithm, information concerning information embedded location, and the like are concealed. Here, such a digital watermark technique is called a private key digital watermark here.

Incidentally, the digital watermark method capable of publishing the algorithm of a digital watermark (digital watermark algorithm), the embedment location of digital watermark information and the like is disclosed in, for example, U.S. Pat. No. 6,807,285. More specifically, in this method, the digital contents are wholly subjected to an error correction encoding process, whereby, even if the embedded information at the published location is damaged, the damaged embedded information can be restored from the whole of the digital contents.

Moreover, in the above digital watermark method, error correction is executed without depending on the digital watermark algorithm, whereby it is possible to publish the digital watermark algorithm. That is, the digital watermark method by which the digital watermark algorithm and the information-embedded location can be published is called a published key digital watermark here.

More specifically, in the published key digital watermark disclosed in U.S. Pat. No. 6,807,285, the watermark information is embedded in a first area of an image by the published digital watermark method, and an error correction code (that is, the information used for restoring the watermark information) is embedded in a second area different from the first area. Here, although it is possible to publish the first area in which the watermark information is embedded, it is necessary to conceal the second area in which the error correction code is embedded.

Moreover, the published key digital watermark disclosed in U.S. Pat. No. 6,807,285 is used to embed various information such as copyright information, user information and the like. Here, with respect to the same digital content, the user information is inevitably different if the user is different. In contrast, the copyright information is always the same with respect t the same digital content. However, any method which is specialized only to embed information such as the copyright information which is common to the certain content is not proposed conventionally.

DISCLOSURE OF THE INVENTION

The present invention has been completed in consideration of such a conventional problem as above, and the object thereof is to be able to provide a public key digital watermark method which is specialized to information common to a certain content.

An image processing device according to the present invention is characterized by comprising:

an error correction encoding unit adapted to execute encoding by setting arrangement order of digital data in input digital contents to become predetermined arrangement order, so that the input digital contents constitute an error correction code.

Another characteristic of the present invention is to provide an image processing device comprising:

a digital watermark embedding unit adapted to embed a digital watermark in input digital contents; and an error correction encoding unit adapted to execute encoding by setting arrangement order of digital data in the digital contents, in which the digital watermark has been embedded by the digital watermark embedding unit, to become predetermined arrangement order, so that the digital contents in which the digital watermark has been embedded constitute an error correction code.

Still another characteristic of the present invention is to provide an image processing device comprising:

a first digital watermark embedding unit adapted to embed a digital watermark in input digital contents;

an arrangement order test unit adapted to test whether or not the digital contents in which the digital watermark has been embedded by the first digital watermark embedding unit constitute an error correction code in the state that arrangement order of the digital contents becomes predetermined arrangement order; and a second digital watermark embedding unit adapted to again embed the digital watermark so that the digital contents in which the digital watermark has been embedded by the first digital watermark embedding unit become a codeword of the error correction code, according to a test result of the arrangement order test unit.

An image processing method according to the present invention is characterized by comprising:

an error correction encoding step of executing encoding by setting arrangement order of digital data in input digital contents to become predetermined arrangement order, so that the input digital contents constitute an error correction code.

Another characteristic of the present invention is to provide an image processing method comprising:

a digital watermark embedding step of embedding a digital watermark in input digital contents; and an error correction encoding step of executing encoding by setting arrangement order of digital data in the digital contents, in which the digital watermark has been embedded in the digital watermark embedding step, to become predetermined arrangement order, so that the digital contents in which the digital watermark has been embedded constitute an error correction code.

Still another characteristic of the present invention is to provide an image processing method comprising:

a first digital watermark embedding step of embedding a digital watermark in input digital contents;

an arrangement order test step of testing whether or not the digital contents in which the digital watermark has been embedded in the first digital watermark embedding step constitute an error correction code in the state that arrangement order of the digital contents becomes predetermined arrangement order; and a second digital watermark embedding step of again embedding the digital watermark so that the digital contents in which the digital watermark has been embedded in the first digital watermark embedding step become a codeword of the error correction code, according to a test result of the arrangement order test step.

Other objects, features and advantages of the invention will become apparent from the following detailed description taken in conjunction with the accompanying drawings.

BEST MODE FOR CARRYING OUT THE INVENTION

First Embodiment

In the present invention, the whole of data which is the target of embedding (called embedding-target data) or the specific portion of the embedding-target data is subjected to error correction encoding. By doing so, even if the information which has been embedded at a published location is damaged or changed, the present invention enables to recover the damaged or changed information by decoding the whole of the embedding-target data or the specific portion of the embedding-target data.

Here, the embedding-target data has a certain limit value h concerning quality. Thus, if the image data is damaged or changed to the extent exceeding the limit value h, the quality of the relevant image data deteriorates to the extent that a user cannot be satisfied. Incidentally, the present invention is applicable to various data such as moving image data, voice data and the like. However, in the following, it is assumed that the present invention is applied to a still image (still image data) for simplifying the explanation. Moreover, the embedding-target data is called an original image, and deterioration of the quality of the image data due to insertion (embedment) of watermark information and another damage is called image quality deterioration.

In the present invention, at least any one or more of the information concerning the following items (1), (2) and (3) is published.

(1) an extraction method/judgment method for a digital watermark to be used (2) a location of digital watermark information (3) arrangement order of error correction encoded information, and an error correction decoding method However, it is assumed that (1) "an extraction method/judgment method for a digital watermark to be used" is equivalent to the method which can achieve some kind or another judgment even if any embedding is not executed. For example, in this method, if the embedding-target data (for example, brightness of a pixel, a coefficient of a frequency-converted certain band, or the like) is judged as "1" when it is equal to or higher than a certain threshold, while the embedding-target data is judged as "0" when it is smaller than the certain threshold, then it is possible to judge whether "1" or "0" from the initial value of the relevant data even if the embedding is not actually executed. However, the present invention is not limited to the above method. That is, in addition to the above method, any digital watermark method which can achieve some kind or another judgment even if any embedding is not executed may be adopted.

Incidentally, various kinds of error correction codes are applicable to the error correction code to be used for "(3) arrangement order of error correction encoded information, and an error correction decoding method". For example, block codes such as a BCH (Bose-Chaudhuri-Hocquenghem) code, an algebraic geometry code, etc., a convolution code (tree code), a turbo code, and the like are applicable.

Figure 1:
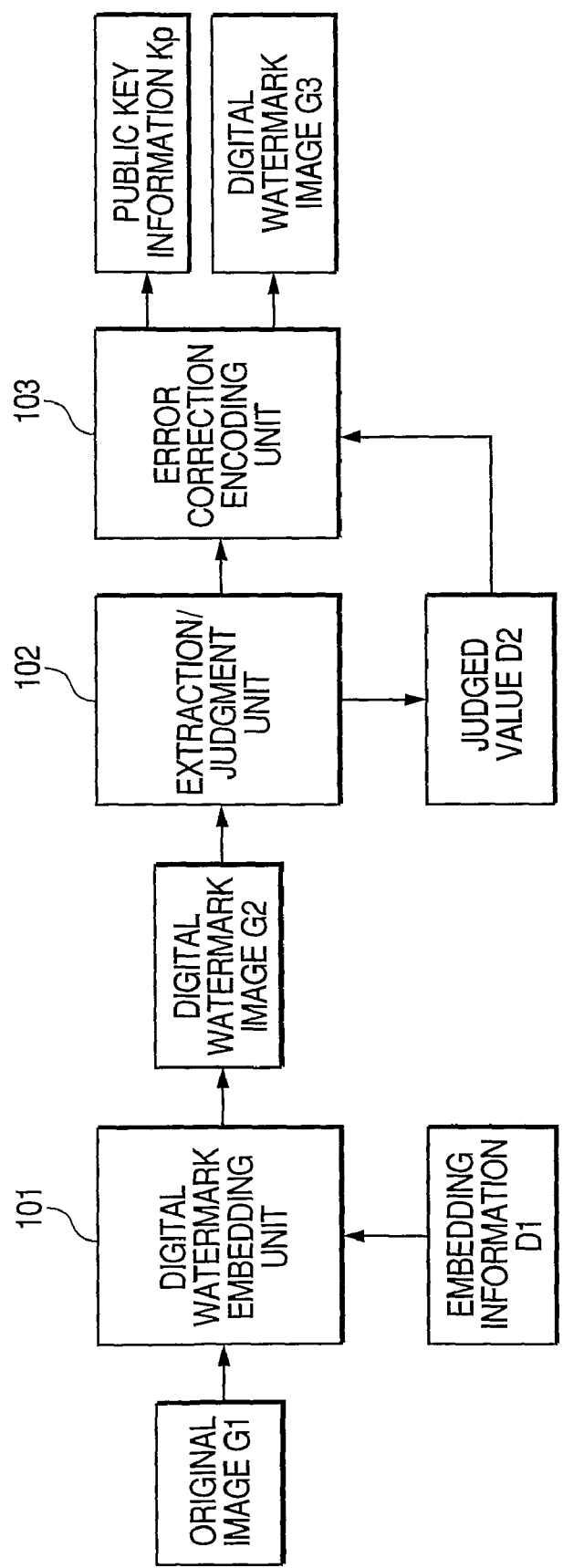
FIG. 1 is a block diagram showing an example of the schematic constitution of an embedding device according to the first embodiment of the present invention.
Figure 2:
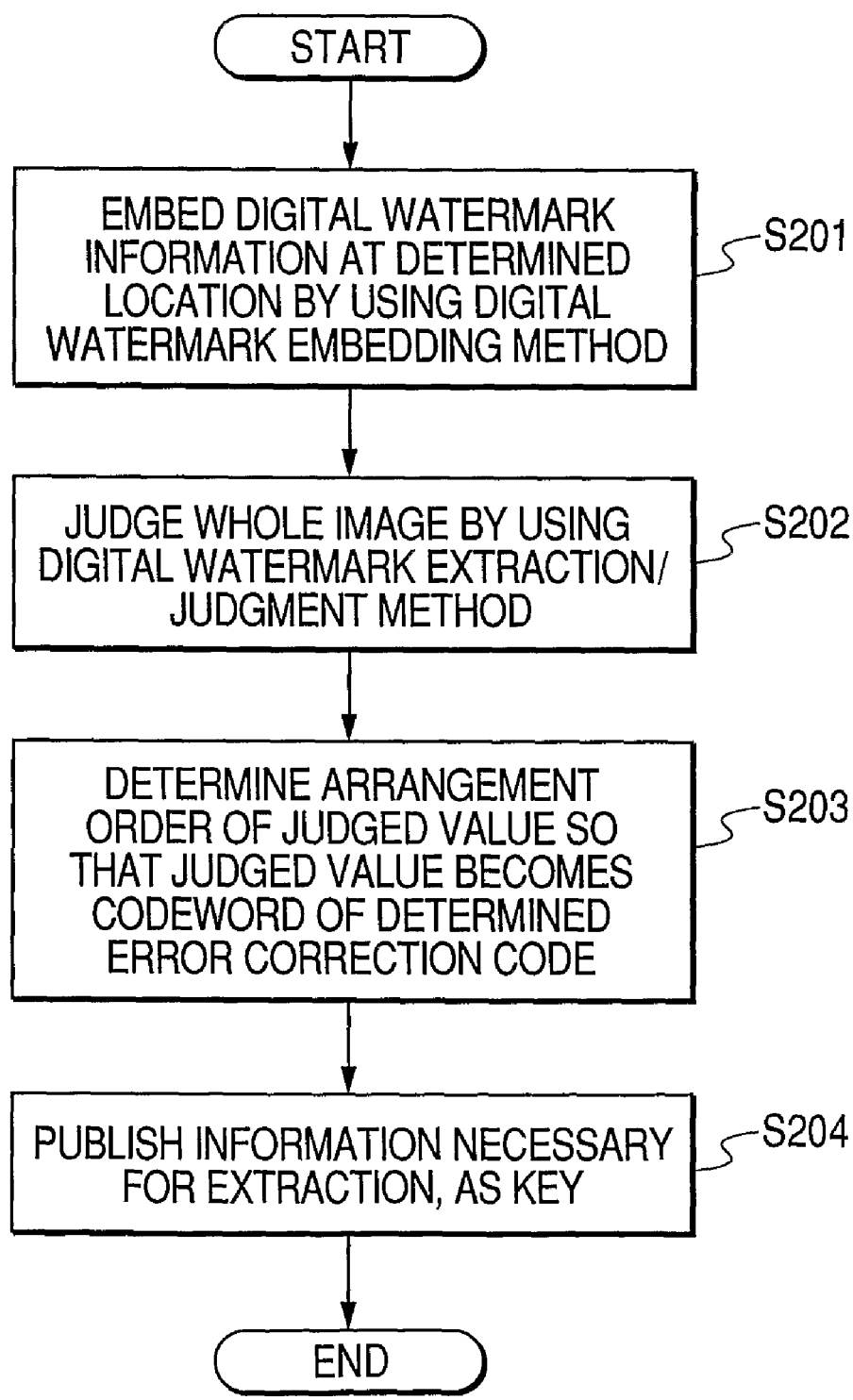
FIG. 2 is a flow chart for explaining an outline of the procedure to be executed in an embedding process according to the first embodiment of the present invention.

FIG. 1 is a block diagram showing an example of the schematic constitution of an embedding device according to the present embodiment, and FIG. 2 is a flow chart for explaining an outline of the procedure to be executed in an embedding process according to the present embodiment. In the present embodiment, as (1) "an extraction method/judgment method for a digital watermark to be used", for example, a method of dividing an image into plural blocks, judging as "0" when the average value of the brightness of the respective blocks is lower than a certain threshold, judging as "1" when the relevant average value is equal to or higher than the certain threshold, and handling and controlling the average value of the brightness of the respective blocks according to the information to be embedded is used by way of example. As described above, it is possible to use another digital watermark method such as the method which can achieve some kind or another judgment even if any embedding is not executed. Moreover, it is assumed that (1) "an extraction method/judgment method for a digital watermark to be used", (2) "a location of digital watermark information" and (3) "arrangement order of error correction encoded information, and an error correction decoding method" have been all determined and published. Therefore, the process shown in FIGS. 1 and 2 is executed to determine and publish (3) "arrangement order of error correction encoded information".

In FIG. 1, an original image G1 is the image in which a digital watermark is not embedded yet, and a digital watermark image G2 is the image which is acquired by embedding the digital watermark in the original image G1. Besides, a digital watermark image G3 is the image which is acquired by executing the error correction encoding to the digital watermark image G2, and embedding information D1 is the information series which is to be embedded in the original image G1.

A digital watermark embedding unit 101 embeds the digital watermark by handling the location determined by the above item (2), that is, the brightness of the determined block in the image, according to the embedding method corresponding to the extraction/judgment method for the digital watermark determined by the above item (1). An extraction/judgment unit 102 executes extraction/judgment to all the blocks of the digital watermark image G2 according to the extraction/judgment method for the digital watermark determined by the above item (1), thereby acquiring a judged value D2 for all the blocks. In this case, order of extraction/judgment to the respective blocks of the digital watermark image G2 is not determined, whereby the judged value D2 is equivalent to the aggregate of "0" and "1" which are the results of judgment for all the blocks according to the extraction/judgment method. Therefore, an error correction encoding unit 103 determines the arrangement order of arranging "0" and "1" which constitute the judged value D2 so that "0" and "1" constitute a codeword of the error correction code of the above item (3) with respect to the judged value D2. In other words, the judged value D2 of which the arrangement order has been determined is resultingly considered to have been subjected to the error correction encoding. In this process, the fact that the arrangement order of "0" and "1" constituting the judged value D2 is determined implies that order in an extraction/judgment process during a decoding process of the respective blocks of the digital watermark image G2 corresponding to "0" and "1" is determined, and the determined order is published as the arrangement order of the information subjected to the error correction encoding of the above item (3). Moreover, it should be noted that the above process is executed to merely determine the arrangement order, whereby the digital watermark image G2 itself does not change and is the same as the digital watermark image G3. Thus, the whole information concerning the above items (1), (2) and (3) is determined and published as public key information Kp.

Subsequently, the procedure to be executed in the embedding process will be explained with reference to the flow chart of FIG. 2.

Initially, in a step S201, the embedding information D1 is embedded at the embedding location on the original image G1 determined by the above item (2), by using the digital watermark embedding unit 101.

Then, in a step S202, the extraction/judgment is executed to all the blocks of the digital watermark image G2 by the extraction/judgment unit 102, whereby the judged value D2 being the aggregate of judged "0" and "1" is acquired. In the present embodiment, to simplify the explanation, the whole image is handled as the target to be extracted. However, a predetermined partial block of the image may be handled as the target to be extracted.

Subsequently, in a step S203, the arrangement order is determined by the error correction encoding unit 103 so that the judged value D2 acquired from the extraction/judgment unit 102 constitutes one codeword. Thus, the digital watermark image G3 has the arrangement order corresponding to the one codeword. Incidentally, as described above, the judged value D2 is equivalent to the aggregate of "0" and "1" of which the arrangement order is not yet determined at the end of the process of the step S202. Therefore, in the step S203, the arrangement order of "0" and "1" which constitute the judged value D2 is determined so that the judged value D2 becomes the codeword of the error correction determined by the above item (3). That is, the error correction encoding is executed. Then, the arrangement order of "0" and "1" determined as above is set as the order of the extraction/judgment processes for the blocks from which "0" and "1" have respectively been extracted and judged. The set order is equivalent to the arrangement order of the error correction encoded information of the above item (3).

Then, in a step S204, the above items (1) to (3) are published as the public key information Kp. However, since the information of the above items (1) and (2) and the decoding method of the error correction code of the above item (3) are all determined before the embedding process, only the arrangement order of the error correction encoded information of the above item (3) is the published information to be added here.

Next, the extraction process will be explained.

Figure 4:
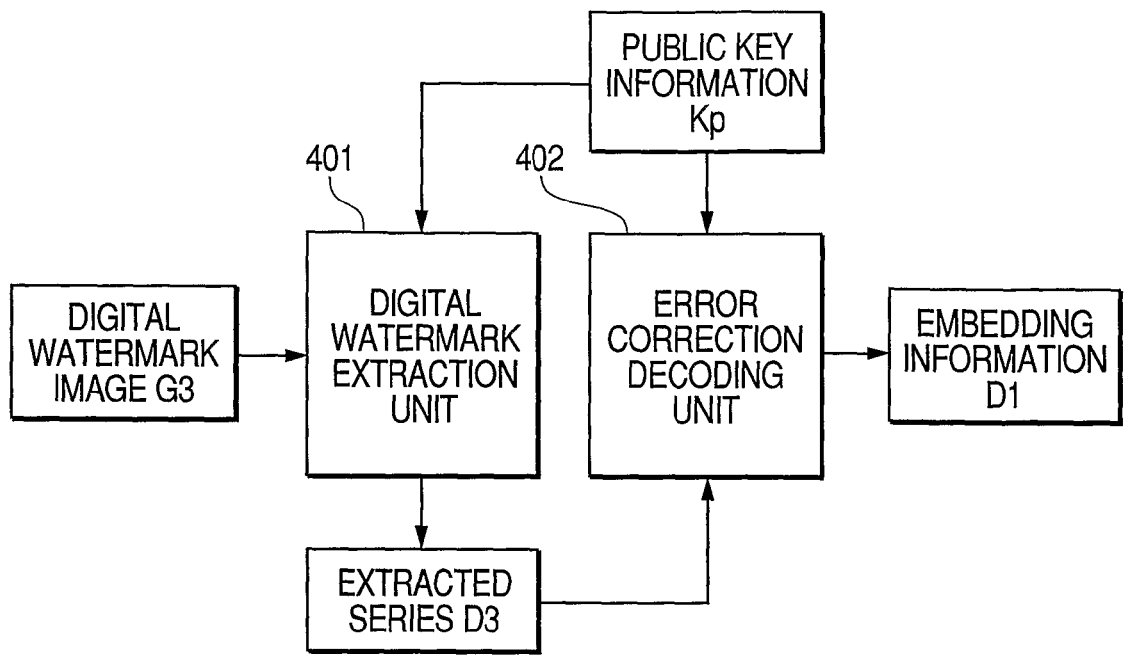
FIG. 4 is a block diagram showing an example of the schematic constitution of an extraction device according to the first embodiment of the present invention.
Figure 5:
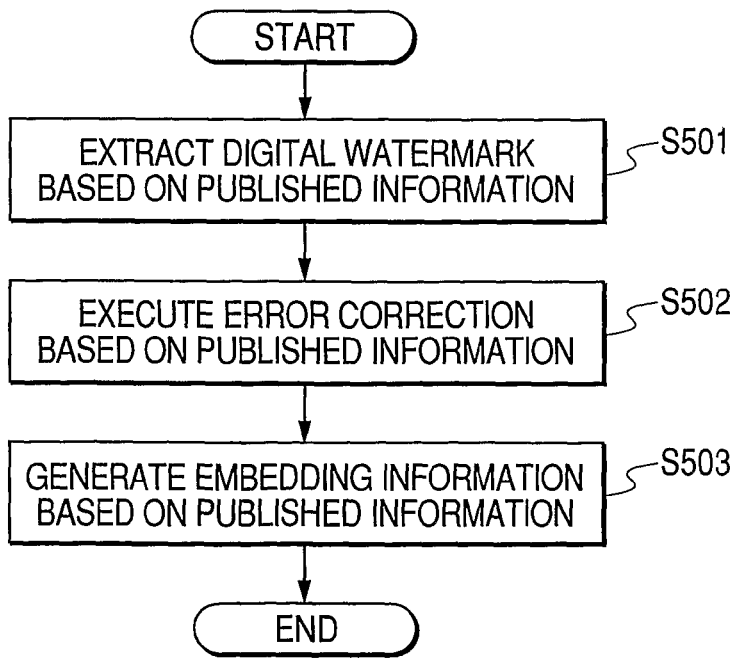
FIG. 5 is a flow chart for explaining an outline of the procedure to be executed in an extraction process according to the first embodiment of the present invention.

FIG. 4 shows an example of the schematic constitution of an extraction device according to the present embodiment, and FIG. 5 shows the procedure to be executed in the extraction process according to the present embodiment.

In FIG. 4, an extracted series D3 is the series which is extracted as the watermark information from the digital watermark image G3.

A digital watermark extraction unit 401 extracts the embedded information according to the extraction/judgment method for the digital watermark determined by the above item (1), arranges "0" and "1" being the extracted results from the blocks according to the arrangement order determined by the above item (3), thereby constituting the extracted series D3. Then, an error correction decoding unit 402 executes, to the extracted series D3, the error correction decoding determined by the above item (3).

The public key information Kp is the information concerning the arrangement order of the above item (3) and the location of the digital watermark information of the above item (2), and gives the information to the digital watermark extraction unit 401 and the error correction decoding unit 402. Moreover, the embedding information D1 is the embedding information at the location corresponding to the digital watermark information of the above item (2) in the corrected results of the public key information Kp.

Subsequently, the procedure to be executed in the extraction process will be explained with reference to the flow chart of FIG. 5.

Initially, in a step S501, the extraction/judgment of the digital watermark is executed from the whole of the digital watermark image G3 by the digital watermark extraction unit 401, whereby the extracted series D3 is output.

Then, in a step S502, the arrangement order of the extracted series D3 is determined based on the public key information Kp to constitute the error correction code, and the acquired code is decoded by the error correction decoding unit 402. Here, the location of the embedding information is previously determined by the above item (2), whereby erasure correction can be executed.

Next, in a step S503, the embedding information D1 at the embedding location of the above item (2) is acquired from the decoding result by the error correction decoding unit 402. Here, it is assumed that an illegal person destroys the digital watermark information based on the published information, and that the code length of the used error correction code is n, the minimum distance thereof is d, and the length of the embedded digital watermark information is a. That is, the illegal person can destroy the digital watermark information based on the published digital watermark information location.

In any case, in case of executing the erasure correction, the destroyed information can be corrected if the error correction code to be used satisfies the relation $d > a + 2 \times b$ (b is natural number), whereby it is necessary for the illegal person to further destroy the data equal to or higher than the natural number b. However, when the above-assumed limit value h concerning the deterioration of image quality satisfies the relation $h < b + a$, if the illegal person randomly damages the data equal to or higher than the natural number b, the data resultingly changes to the extent exceeding the limit value h.

Incidentally, since the error correction code determined by the above item (3) can be arbitrarily selected, the natural number b becomes large if the code of which the minimum distance d is large is selected, whereby it can exceed the limit value h concerning the deterioration of image quality. This fact implies that it is impossible for the illegal person to acquire the data of which the deterioration of image quality is small without exceeding the limit value h.

Thus, it is possible by publishing the information concerning the above items (1) to (3) to publish the extraction process, and it is further possible to construct the digital watermark method which has security for the extracted information. Moreover, in the present embodiment, to simplify the explanation, the target of embedding of the digital watermark is a spatial area, and the target of encoding is the whole image. However, it is apparent that the present invention is not limited to them.

In particular, by executing frequency transformation to the original image through Fourier transformation, discrete cosine transformation or the like, the target of digital watermark embedding is set to a frequency area, a digital watermark is embedded in the high-frequency area, and the target of encoding is set to the low-frequency area. Thus, it is possible to reduce deterioration of the image quality with respect to embedding of the digital watermark, and it is also possible to increase deterioration of the image quality with respect to attack by the illegal person.

In this case, it only has to execute the frequency transformation to the original image before the processes respectively shown in FIGS. 2 and 5, and to add a process of executing frequency inverse transformation after the processes. In other words, it only has to insert a frequency transformation unit and a frequency inverse transformation unit before and after the digital watermark embedding unit 101 of FIG. 1 and the digital watermark extraction unit 401 of FIG. 4.

Moreover, in the present embodiment, the encoding is executed with one code. However, it is possible to encode an identical image with plural codes by changing arrangement order or the like with respect to each code. In addition, it is also possible to divide an image into plural portions, and then execute encoding with respect to each of the divided portions or with respect to the plural portions which are permitted to overlap each other. In this case, it is necessary to repeat the processes of the steps S203 and S502 as many as the number of used codes.

Besides, in the present embodiment, the method in which the judged values "0" and "1" extracted as the digital watermark are used as the symbols to execute the error correction-encoding is explained for simplification. However, it is possible to consider a multivalued digital image itself as the aggregate of multivalued symbols (pixels) and thus directly execute the error correction encoding without extracting the digital watermark. In this case, in the embedding device, the extraction/judgment unit 102 shown in FIG. 1 and the step S202 shown in FIG. 2 can be skipped. Then, the pixel value of the image may directly be used instead of the judged value.

In this instance, in the extraction device, the digital watermark image G3 is directly input to the error correction decoding unit 402, and only the information at the published location is extracted from the decoded result by the error correction decoding unit 402.

Figure 3:
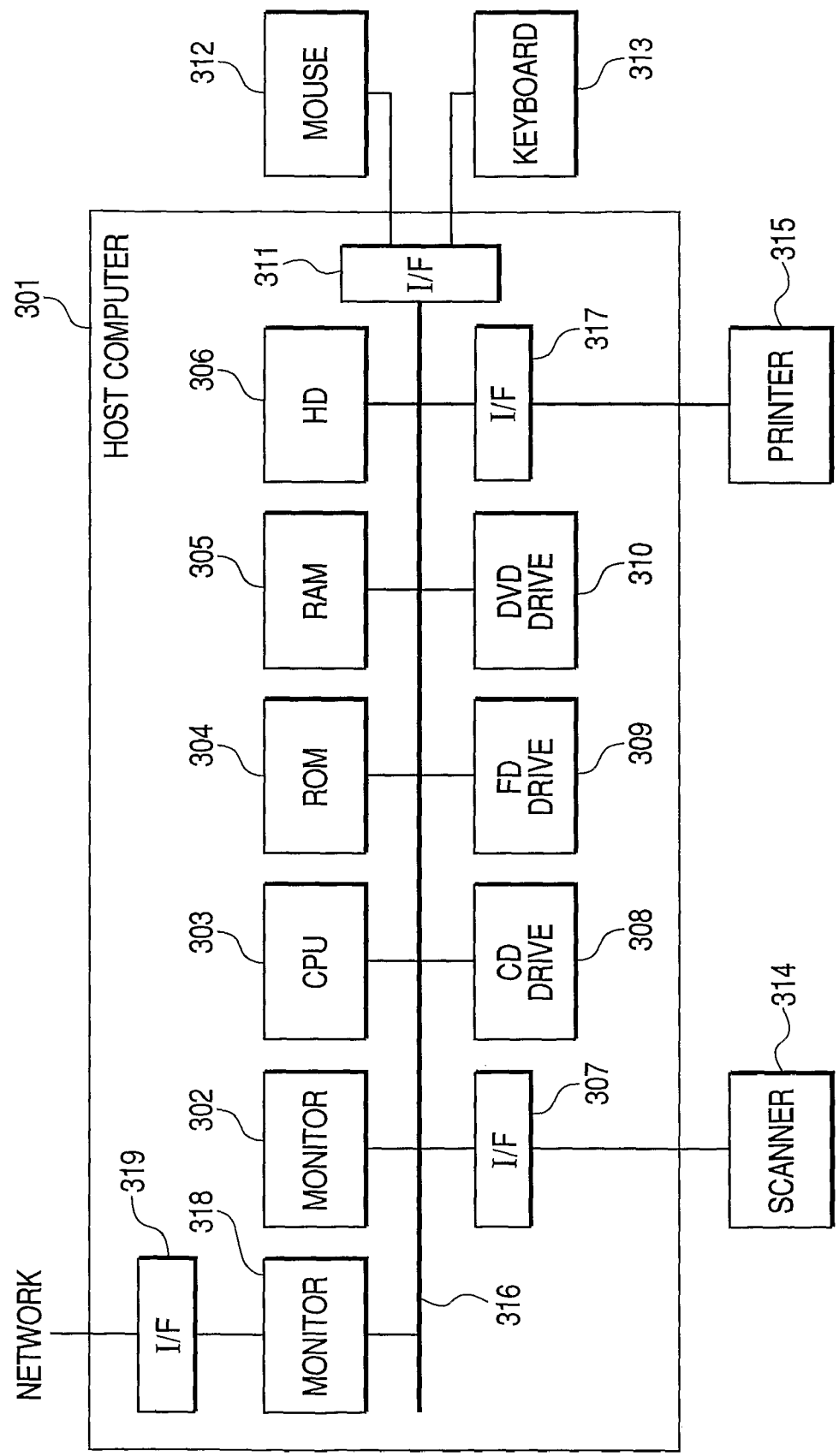
FIG. 3 is a block diagram showing an example of the hardware constitution by which the embedding device according to the first embodiment of the present invention can be accomplished.

At the last, it should be noted that the digital watermark embedding device and the digital watermark extraction device according to the present embodiment can be achieved by a signal processing device shown in FIG. 3, in addition to the constitutions shown in FIGS. 1 and 4.

In FIG. 3, a host computer 301 is, for example, a commonly used personal computer which can receive a read image from a scanner 314, edit the received image, and store the edited image. Moreover, the host computer 301 can cause a printer 315 to print the image acquired by the host computer 301. Incidentally, various instructions and the like manually issued by a user are input through a mouse 312 and a keyboard 313. Numeral 317 denotes an I/F (interface) for the printer 315.

In the host computer 301, later-described blocks are mutually connected through a bus 316, whereby various data can be exchanged. In FIG. 3, numeral 302 denotes a monitor, and numeral 303 denotes a CPU which controls the respective operations of the blocks and executes the programs stored in the host computer 301. Numeral 304 denotes a ROM which stores a specific image not admitted to be printed, and previously stores necessary image processing programs and the like.

Numeral 305 denotes a RAM which temporarily stores programs and process-target image data for the process of the CPU 303. Numeral 306 denotes an HD (hard disk) which can previously store the programs and the image data to be transferred to the RAM 305 and the like. Moreover, the HD 306 can also store the processed image data. Numeral 307 denotes a scanner I/F (interface) which is connected to the scanner 314 which reads an original, a film and the like by using a CCD and thus generates image data. Thus, the scanner I/F 307 can input the image data generated by the scanner 314.

Numeral 308 denotes a CD (compact disk) drive which can read the data stored in a CD (or CD-R) being one of external storage media or write the data into the CD, numeral 309 denotes an FD (flexible disk or Floppy® disk) drive which can, as well as the CD drive 308, read the data stored in an FD being one of the external storage media or write the data into the FD, and numeral 310 denotes a DVD (digital versatile disk) drive which can, as well as the CD drive 308, read the data stored in a DVD being one of the external storage media or write the data into the DVD. Incidentally, when the program used for image editing or the printer driver has been stored in the CD, the FD, the DVD or the like, the stored program or the stored driver is installed onto the HD 306, and then transferred to the RAM 305 according to need.

Numeral 311 denotes an I/F (interface) which is connected to the mouse 312 or the keyboard 313 to receive the input instructions from the mouse 312 or the keyboard 313, and numeral 318 denotes a modem which is connected to an external network through an I/F 319.

According to the present embodiment, the embedding amount of the digital watermark information can be made small, and the digital watermark information can be embedded in the high-frequency area. Thus, it is possible to achieve the public key digital watermark method by which deterioration of image quality is remarkably small.

Second Embodiment

Subsequently, the second embodiment of the present invention will be explained hereinafter.

In the above first embodiment, the published information concerning the above items (1) and (2) and the error correction decoding method of the above item (3) are previously published, and the published information concerning the arrangement order of the error correction encoded information of the above item (3) is published at the last. In the meanwhile, in the present embodiment, only the published information of the above item (1) and the error correction decoding method of the above item (3) are previously published, and the information concerning the above item (2) and the published information concerning the arrangement order of the error correction encoded information of the above item (3) are published at the last. Incidentally, it should be noted that the information to be published, the constitution of the extraction device, the procedure of the extraction process and the like in the present embodiment are respectively the same as those in the first embodiment.

Figure 6:
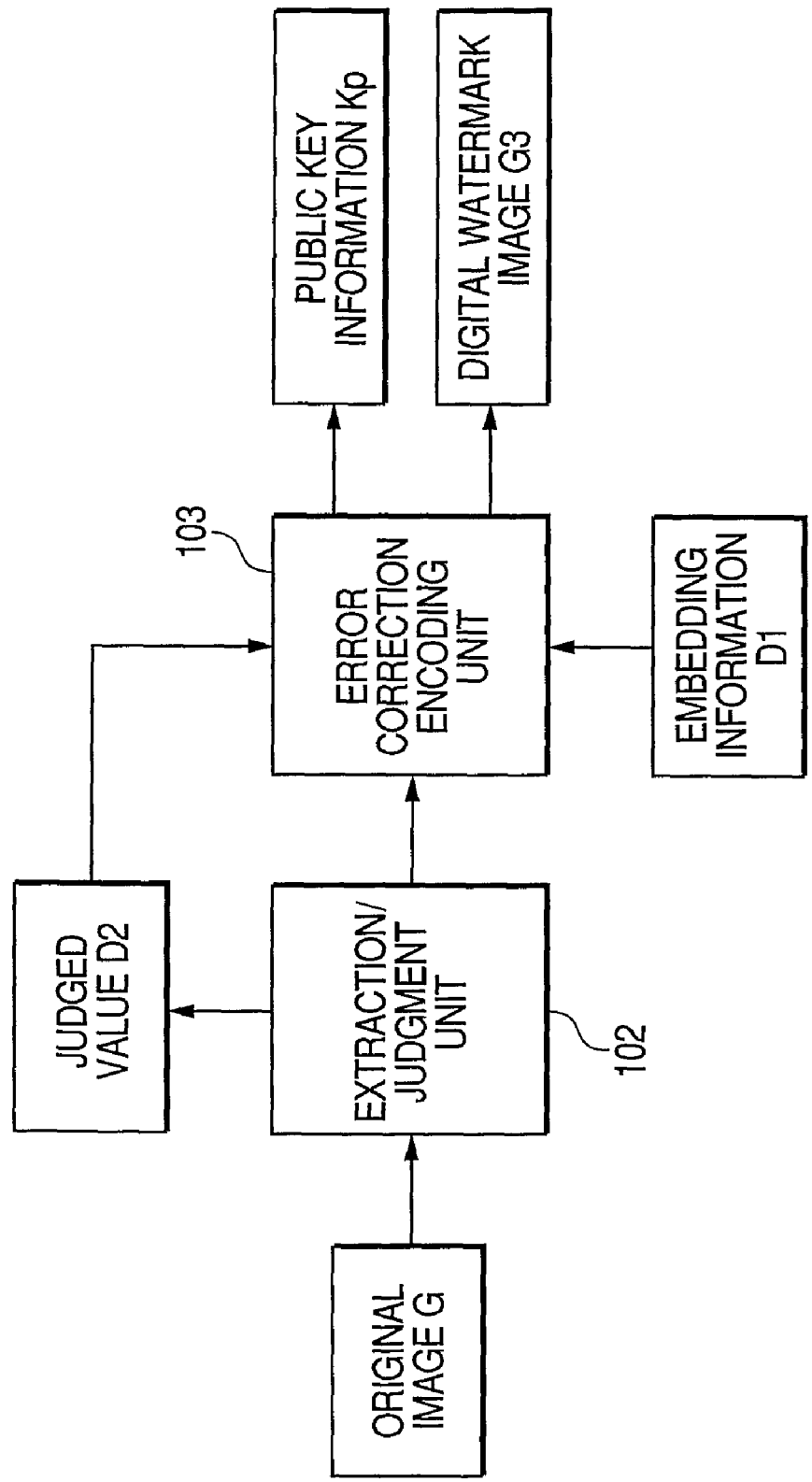
FIG. 6 is a block diagram showing an example of the schematic constitution of an embedding device according to the second embodiment of the present invention.
Figure 7:
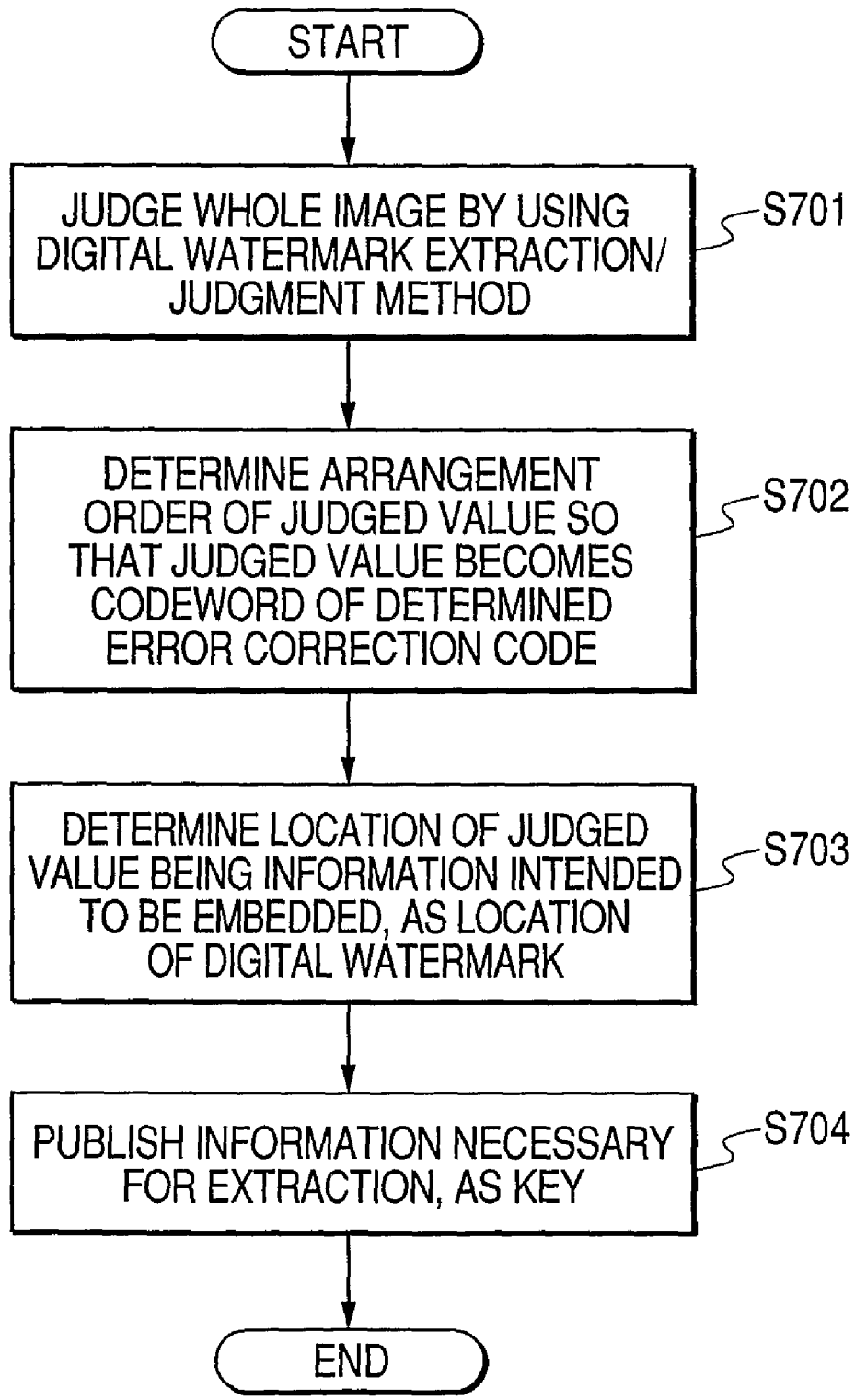
FIG. 7 is a flow chart for explaining an outline of the procedure to be executed in an embedding process according to the second embodiment of the present invention.

FIG. 6 shows the constitution of an embedding device according to the present embodiment, and FIG. 7 shows a flow chart for explaining the procedure to be executed in an embedding process according to the present embodiment. In the present embodiment, as well as the first embodiment, as the extraction/judgment method for the digital watermark determined by the above item (1), for example, a method of dividing an image into plural blocks, and changing the brightness of the respective blocks is used by way of example. As described above, it is possible to use another digital watermark method such as the method which can achieve some kind or another judgment even if any embedding is not executed. Moreover, the decoding method of the error correction code of the above item (3) can be selected from among the known error correction codes which achieve necessary correction capability. In FIG. 6, the embedding device of the present embodiment includes an extraction/judgment unit 102 and an error correction encoding unit 103. Here, in the present embodiment, it should be noted that the constituent elements of the same names as those in the first embodiment are substantially the same constituent elements as those in the first embodiment.

In FIG. 7, in a step S701, the extraction/judgment is executed to the whole of an original image G by the extraction/judgment unit 102 which execute the method determined by the above item (1), whereby a judged value D2 is output. In the present embodiment, to simplify the explanation, the whole image is handled as the target to be extracted. However, a predetermined portion of the image may be handled as the target to be extracted.

Then, in a step S702, the arrangement order is determined by the error correction encoding unit 103 so that the series of the judged value D2 acquired from the extraction/judgment unit 102 constitutes one codeword. Thus, the original image G has the arrangement order corresponding to the one codeword. This is the same process as that in the first embodiment, and the arrangement order of the judged value D2 which is not determined in the step S701 is determined by the error correction encoding process in the step S702. Thus, the arrangement order of the error correction encoded information of the above item (3) is determined.

Subsequently, in a step S703, the location of the judged value which conforms to embedding information D1 in the judged value D2 acquired in the step S702 is determined as the location of the digital watermark information. By such a process, the embedding information D1 can correspond to the data in the judged value D2. In any case, in the first embodiment, since the embedding location of the above item (2) is previously determined, the digital watermark embedding process is necessary so that the information at the embedding location becomes the same as the embedding information D1. In contrast, in the present embodiment, the location having the same information as the embedding information D1 is determined as the digital watermark embedding location of the above item (2). Thus, the digital watermark embedding process can be omitted, whereby it is possible to eliminate deterioration of image quality due to efficiency in the process and embedding of the digital watermark.

Then, in a step S704, the determined information of the above items (1) to (3) is published as public key information Kp. However, since the information of the above item (1) and the decoding method of the error correction code of the above item (3) are determined before the embedding process, the above information and method can be published previously. In this case, only the arrangement order of the above items (2) and (3) is the information to be published here.

In any case, according to the present embodiment, it is possible to achieve the public key digital watermark method from which the embedding itself of the digital watermark information is omitted.

In this case, although the digital watermark information itself is not embedded, the information is extracted by reading from the contents location designated as the item (2) the information by the method designated by the item (1). For example, to determine as the extracted information the brightness information itself at the location designated as the item (2) can be designated as the item (1).

Third Embodiment

Subsequently, the third embodiment of the present invention will be explained hereinafter.

It should be noted that only the above item (1) can previously be determined as the published information in the above second embodiment, and the above items (1) and (2) can previously be determined as the published information in the above first embodiment. In the present embodiment, the method by which the above items (1) to (3) can previously be determined will be explained hereinafter.

Moreover, it should be noted that the information to be published, the constitution of the extraction device, the procedure of the extraction process and the like in the present embodiment are respectively the same as those in the first embodiment.

Figure 8:
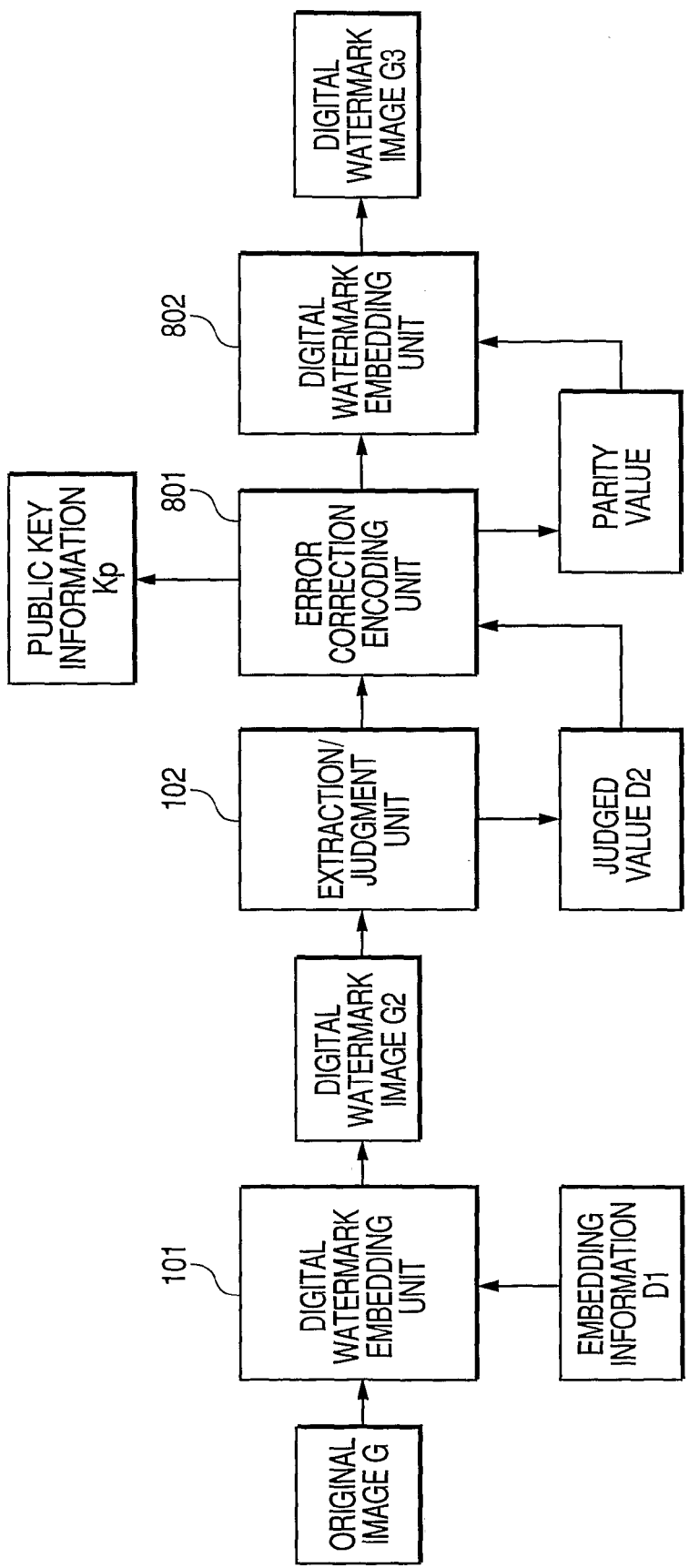
FIG. 8 is a block diagram showing an example of the schematic constitution of an embedding device according to the third embodiment of the present invention.
Figure 9:
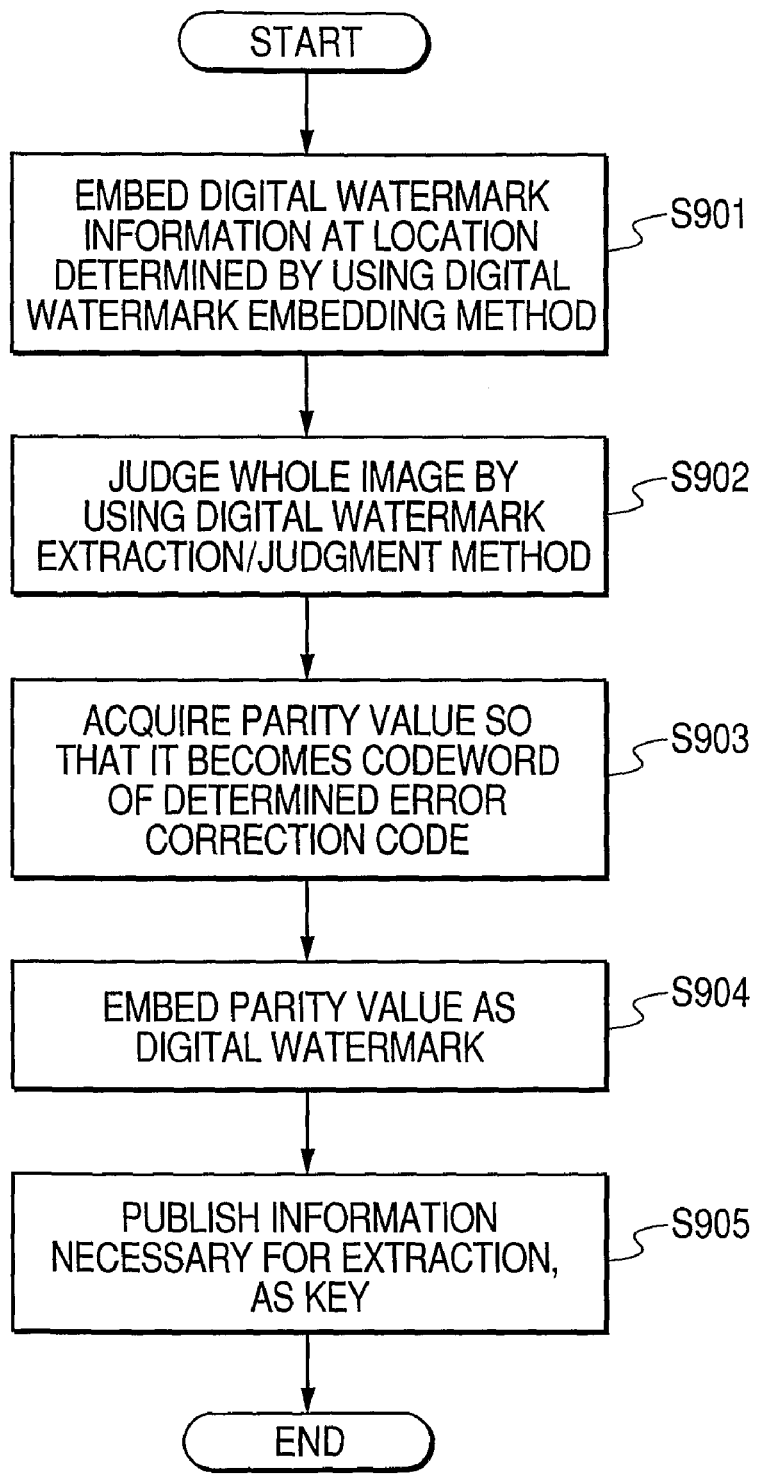
FIG. 9 is a flow chart for explaining an outline of the procedure to be executed in an embedding process according to the third embodiment of the present invention.

FIG. 8 shows the constitution of an embedding device according to the present embodiment, and FIG. 9 shows a flow chart for explaining the procedure to be executed in an embedding process according to the present embodiment.

In FIG. 8, numeral 801 denotes an error correction encoding unit, and numeral 802 denotes a digital watermark embedding unit.

When the process starts, in a step S901, embedding information D1 is embedded on an original image G by using a digital watermark embedding unit 101.

Then, in a step S902, the extraction/judgment is executed to the whole image in which the digital watermark has been embedded by an extraction/judgment unit 102, whereby a judged value D2 is acquired. In the present embodiment, to simplify the explanation, the whole image is handled as the target to be extracted. However, a predetermined partial block of the image may be handled as the target to be extracted.

Subsequently, in a step S903, the judged value D2 acquired from the extraction/judgment unit 102 is subjected to the error correction encoding by the error correction encoding unit 801. Here, the error correction encoding unit 801 outputs a parity value being the parity when the judged value D2 is set to have the arrangement order determined by the above item (3). In the present embodiment, since the arrangement order of the error correction encoded information of the above item (3) is previously determined, unlike the above embodiments, the judged value D2 is not equivalent to the aggregate of "0" and "1" of which the arrangement order is not yet determined, but is one series. Therefore, to execute the error correction encoding to the judged value D2, the parity locations of the number corresponding to error correction capability are determined in the judged value D2, and the parity value corresponding to the series of the judged value D2 except for the determined parity locations is calculated.

Next, in a step S904, the digital watermark embedding unit 802 execute embedding change to the parity value acquired in the step S903, with respect to the digital watermark image G2 generated by the digital watermark embedding unit 101, so that the parity value comes to have the parity value corresponding to the relevant parity location. Thus, a digital watermark image G3 output from the digital watermark embedding unit 802 has the arrangement order corresponding to one codeword.

Then, in a step S905, the above items (1) to (3) necessary for the extraction are published as published information. However, in the present embodiment, since the information of the above items (1) to (3) can be determined before the embedding process, the relevant information can previously be published.

Moreover, according to the present embodiment, if the digital watermark is embedded in a high-frequency area and the target of encoding is set as a low-frequency area, it is possible to reduce deterioration of the image quality with respect to embedding of the digital watermark, and it is also possible to increase deterioration of the image quality with respect to attack by an illegal person.

In addition, according to the present embodiment, the whole of the published information can previously be determined. Therefore, if the published information is set to become the same without depending on the contents, it is possible to extract the digital watermarks in the same procedure with respect to all the contents.

Fourth Embodiment

The public key digital watermarks explained in the above first to third embodiments are used to publish the information necessary for digital watermark extraction. Besides, since the whole contents are subjected to the error correction encoding in these embodiments, the above digital watermarks are also used as the digital watermarks for alteration detection. Here, the present embodiment is directed to an extraction device. That is, each of the embedding devices described in the above first to third embodiments can be used as an embedding device in the present embodiment.

Figure 10:
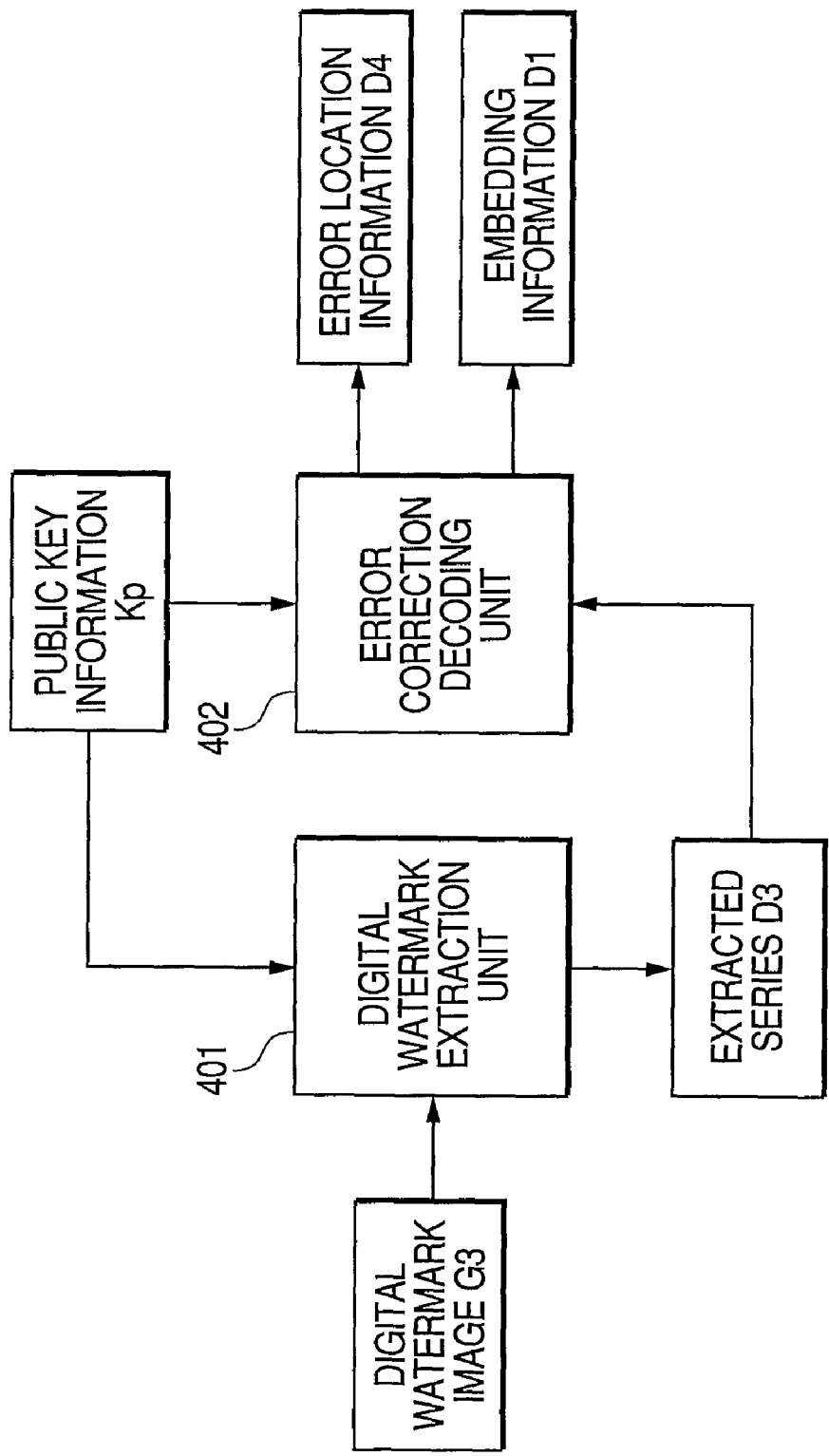
FIG. 10 is a block diagram showing an example of the schematic constitution of an extraction device according to the fourth embodiment of the present invention.

First, an extraction process will be explained. FIG. 10 shows the schematic constitution of the extraction device according to the present embodiment, and FIG. 11 shows the procedure to be executed in the extraction process according to the present embodiment.

In FIG. 10, it should be noted that the constituent elements of the same names as those in the first and second embodiments are substantially the same constituent elements as those in these embodiments.

Figure 11:
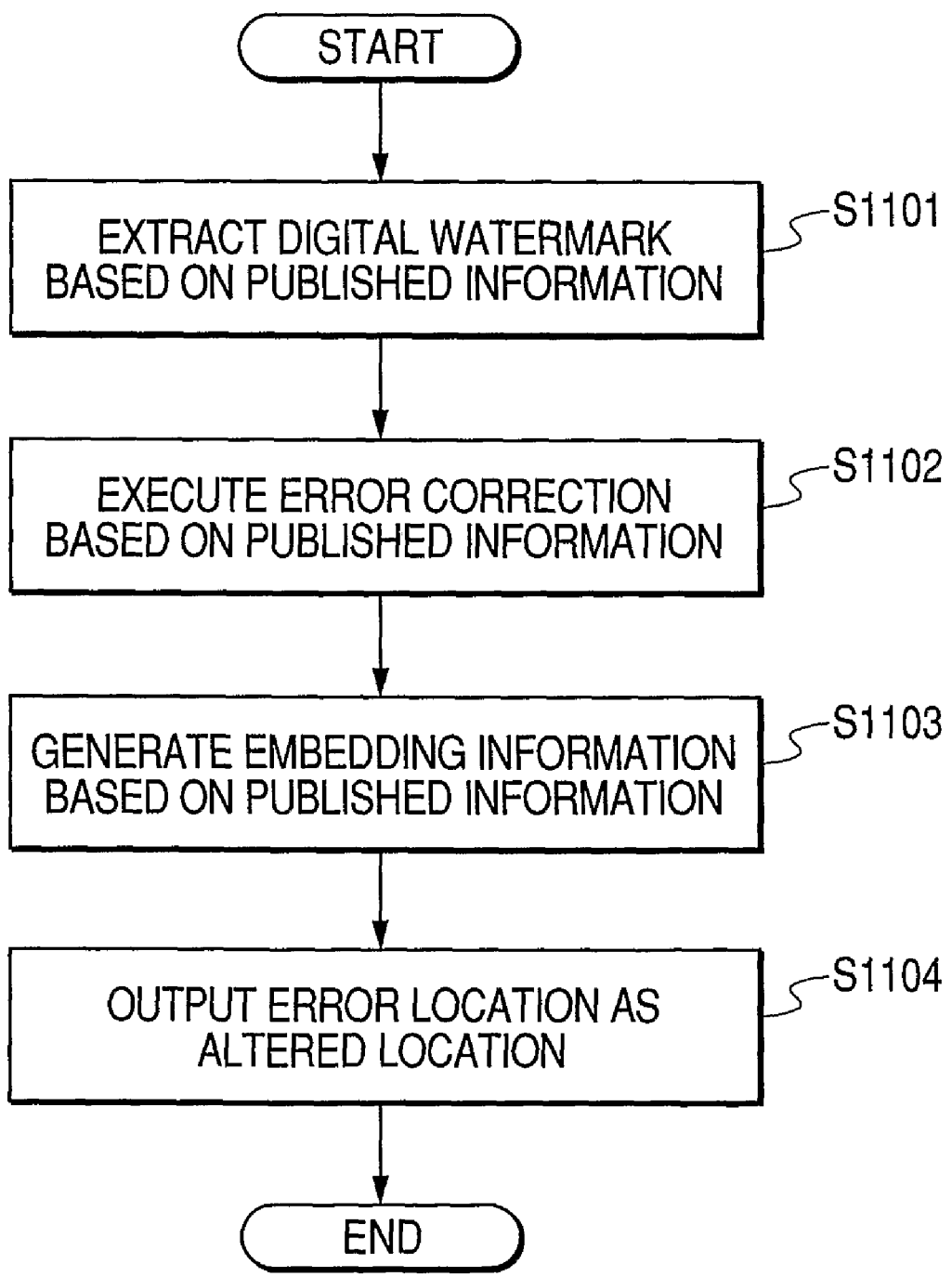
FIG. 11 is a flow chart for explaining an outline of the procedure to be executed in an extraction process according to the fourth embodiment of the present invention.

As shown in the flow chart of FIG. 11, in a step S1101, the extraction/judgment of the digital watermark is executed from the whole of the digital watermark image G3 by the digital watermark extraction unit 401 with use of the published information of the above item (1), whereby the extracted series D3 is output.

Then, in a step S1102, the arrangement order of the extracted series D3 is determined based on the public key information Kp of the above published item (3) to constitute the error correction code, and the acquired code is decoded by the error correction decoding unit 402. At this time, an error location is recorded.

Next, in a step S1103, the embedding information D1 at the embedding location of the above item (2) is generated from the decoding result.

Subsequently, in a step S1104, the recorded error location is output as error location information (alteration location information) D4.

Here, in a case where there is no need to know an error pattern and/or the error location, that is, in a case where it only has to detect whether or not an error occurs, if only error detection is executed without executing the error correction in the step S1102, it is possible to more effectively detect an error, that is, it is possible to detect alteration. In such a case, a CRC (Cyclic Redundancy Code) or the like can be used as the error correction code.

According to the present embodiment, the digital watermark is used for the error detection as well as the error correction, whereby it is possible to detect alteration and an alteration location.

Fifth Embodiment

The present invention is not limited to only the device and the method which achieve the above embodiments and the method provided by appropriately combining the methods explained in the above embodiments. That is, the present invention is also applicable to a case where the program codes of software for realizing the above embodiments are supplied to a computer (CPU or MPU) in the system or the apparatus, and the computer in the system or the apparatus thus operates the various devices according to the supplied program codes to realize the above embodiments.

In this case, the above program codes themselves realize the functions of the above embodiments. Therefore, the program codes themselves and a means for supplying the program codes to the computer, that is, a storage medium storing the program codes, are included in the concept of the present invention.

Here, as the storage medium which stores the above program codes, for example, a flexible disk, a hard disk, an optical disk, a magnetooptical disk, a CD-ROM, a magnetic tape, a nonvolatile memory card, a ROM or the like can be used.

Further, the program codes are included in the present invention includes not only in a case where the functions of the above embodiments are realized by controlling the various devices according to the supplied program codes, but also in a case where the supplied program codes cooperate with an OS (operating system) running on the computer or another application software to realize the above embodiments.

Moreover, the present invention also includes a case where, after the program codes are written into a memory of a function expansion board inserted in the computer or a memory in a function expansion unit connected to the computer, a CPU or the like provided in the function expansion board or the function expansion unit executes a part or all of the actual processes on the basis of the instructions of the program codes, and thus the functions of the above embodiments are realized by such the processes.

In other words, the foregoing description of the embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

This application claims priority from Japanese Patent Application Nos. 2004-174519 filed on Jun. 11, 2004 and 2005-167416 filed on Jun. 7, 2005, which are hereby incorporated by reference herein.

The invention claimed is:

1. An image processing device comprising:
an error correction encoding unit adapted to execute encoding by setting an arrangement order of digital data in input digital contents to become a predetermined arrangement order, so that the input digital contents constitute an error correction code; and
a digital watermark extraction unit adapted to extract the digital watermark from the digital contents in which the digital watermark has been embedded,
wherein the predetermined arrangement order is based on an extraction result by said digital watermark extraction unit.

2. An image processing device comprising:
a digital watermark embedding unit adapted to embed a digital watermark in input digital contents;
an error correction encoding unit adapted to execute encoding by setting arrangement order of digital data in the digital contents, in which the digital watermark has been embedded by said digital watermark embedding unit, to become predetermined arrangement order, so that the digital contents in which the digital watermark has been embedded constitute an error correction code; and
a digital watermark extraction unit adapted to extract the digital watermark from the digital contents in which the digital watermark has been embedded,
wherein the predetermined arrangement order is based on an extraction result by said digital watermark extraction unit.

3. An image processing device according to claim 2, wherein
said digital watermark embedding unit embeds the digital watermark at a portion of the input digital contents where it is difficult to easily recognize deterioration of image quality, and
said error correction encoding unit sets the arrangement order which aims at a portion of the input digital contents where it is easy to recognize deterioration of image quality and at the digital watermark.

4. An image processing device comprising:
a first digital watermark embedding unit adapted to embed a digital watermark in input digital contents;
an arrangement order test unit adapted to test whether or not the digital contents in which the digital watermark has been embedded by said first digital watermark embedding unit constitute an error correction code in the state that arrangement order of the digital contents becomes predetermined arrangement order; and
a second digital watermark embedding unit adapted to again embed the digital watermark so that the digital contents in which the digital watermark has been embedded by said first digital watermark embedding unit become a codeword of the error correction code, according to a test result of said arrangement order test unit.

5. An image processing device comprising:
a judged value extraction unit adapted to acquire a judged value of digital contents in which a digital watermark has been embedded; and
an error correction encoding unit adapted to encode, as a digital watermark information location, a location which conforms to digital watermark information in the judged value acquired by said judged value extraction unit,
wherein a digital watermark extraction method by a digital watermark extraction unit corresponding to said digital watermark embedding unit, the digital watermark information location, an error correction code, and a constitution method of codes are published.

6. An image processing device comprising:
an error correction decoding unit adapted to execute error correction decoding of input digital contents; and
a reading unit adapted to read information of a predetermined location of the contents decoded by said error correction decoding unit;
an error location storage unit adapted to store in a recording medium an error location corrected by said error correction decoding unit; and
an alteration location output unit adapted to output as an alteration location the location stored by said error location storage unit.

7. An image processing device comprising:
a digital watermark extraction unit adapted to extract a digital watermark from input digital contents;
an error correction decoding unit adapted to execute error correction decoding of a series extracted by said digital watermark extraction unit;
an error location storage unit adapted to store in a recording medium an error location corrected by said error correction decoding unit; and
an alteration location output unit adapted to output as an alteration location the location stored by said error location storage unit.

8. An image processing device according to claim 7, wherein, when the digital contents are decoded, a digital watermark extraction method, a digital watermark informa- 9. An image processing method comprising:
- an error correction encoding step of executing encoding by setting an arrangement order of digital data in input digital contents to become a predetermined arrangement order, so that the input digital contents constitute an error correction code; and
- a digital watermark extraction step of extracting a digital watermark from the digital contents in which the digital watermark has been embedded,
- wherein the predetermined arrangement order is based on an extraction result by said digital watermark extraction step.

10. An image processing method comprising:
- a digital watermark embedding step of embedding a digital watermark in input digital contents;
- an error correction encoding step of executing encoding by setting arrangement order of digital data in the digital contents, in which the digital watermark has been embedded in said digital watermark embedding step, to become predetermined arrangement order, so that the digital contents in which the digital watermark has been embedded constitute an error correction code; and
- a digital watermark extraction step of extracting a digital watermark from the digital contents in which the digital watermark has been embedded,
- wherein the predetermined arrangement order is based on an extraction result in said digital watermark extraction step.

11. An image processing method according to claim 10, wherein
- said digital watermark embedding step is adapted to embed the digital watermark at a portion of the input digital contents where it is difficult to easily recognize deterioration of image quality, and
- said error correction encoding step is adapted to set the arrangement order which aims at a portion of the input digital contents where it is easy to recognize deterioration of image quality and at the digital watermark.

12. An image processing method comprising:
- a first digital watermark embedding step of embedding a digital watermark in input digital contents;
- an arrangement order test step of testing whether or not the digital contents in which the digital watermark has been embedded in said first digital watermark embedding step constitute an error correction code in the state that arrangement order of the digital contents becomes predetermined arrangement order; and
- a second digital watermark embedding step of again embedding the digital watermark so that the digital contents in which the digital watermark has been embedded in said first digital watermark embedding step become a codeword of the error correction code, according to a test result of said arrangement order test step.

tion location, an error correction code, and a constitution method of codes which are published are used.

13. An image processing method comprising:
- a judged value extraction step of acquiring a judged value of digital contents in which a digital watermark has been embedded; and
- an error correction encoding step of encoding, as a digital watermark information location, a location which conforms to digital watermark information in the judged value acquired in said judged value extraction step,
- wherein a digital watermark extraction method by a digital watermark extraction step corresponding to said digital watermark embedding step, a digital watermark information location, an error correction code, and a constitution method of codes are published.

14. An image processing method comprising:
- an error correction decoding step of executing error correction decoding of input digital contents; and
- a reading step of reading information of a predetermined location of the contents decoded in said error correction decoding step;
- an error location storage step of storing in a recording medium an error location corrected in said error correction decoding step; and
- an alteration location output step of outputting as an alteration location the location stored in said error location storage step.

15. An image processing method comprising:
- a digital watermark extraction step of extracting a digital watermark from input digital contents; and
- an error correction decoding step of executing error correction decoding of a series extracted in said digital watermark extraction step;
- an error location storage step of storing in a recording medium an error location corrected in said error correction decoding step; and
- an alteration location output step of outputting as an alteration location the location stored in said error location storage step.

16. An image processing method according to claim 15, wherein, when the digital contents are decoded, a digital watermark extraction method, a digital watermark information location, an error correction code, and a constitution method of codes which are published are used.

17. A computer-readable recording medium which records therein a computer program for causing a computer to execute an image processing method comprising:
- an error correction encoding step of executing encoding by setting an arrangement order of digital data in input digital contents to become a predetermined arrangement order, so that the input digital contents constitute an error correction code; and
- a digital watermark extraction step of extracting a digital watermark from the digital contents in which the digital watermark has been embedded,
- wherein the predetermined arrangement order is based on an extraction result by said digital watermark extraction unit.

* * * * *